US010118329B2

(12) United States Patent
Wilfong, Jr.

(10) Patent No.: US 10,118,329 B2
(45) Date of Patent: Nov. 6, 2018

(54) AUTOMATED GUSSET INFLATION SYSTEM AND METHOD (75) Inventor: Harry B. Wilfong, Jr., Hartsville, SC (US)

(73) Assignee: Hilex Poly Co. LLC, Hartsville, SC (US)

( * ) Notice: Subject to any disclaimer, the term of this patent is extended or adjusted under 35 U.S.C. 154(b) by 1092 days.

(21) Appl. No.: 13/538,492

(22) Filed: Jun. 29, 2012

(65) Prior Publication Data
US 2013/0134615 A1 May 30, 2013

Related U.S. Application Data (60) Provisional application No. 61/504,003, filed on Jul. 1, 2011, provisional application No. 61/503,707, filed on Jul. 1, 2011.

(51) Int. Cl.
*B29C 49/28* (2006.01)
*B31B 50/00* (2017.01)
*B31B 70/26* (2017.01)

(52) U.S. Cl.
CPC .............. *B29C 49/28* (2013.01); *B31B 50/00* (2017.08); *B31B 70/266* (2017.08)

(58) Field of Classification Search
CPC ........................ B29C 49/28; B31B 2219/269
See application file for complete search history.

(56) References Cited

U.S. PATENT DOCUMENTS

| 3,555,603 | A | | 1/1971 | Haley | |
|---|---|---|---|---|---|
| 3,805,649 | A | * | 4/1974 | Hester | B31D 1/00 83/177 |
| 4,462,779 | A | | 7/1984 | Brinkmeier et al. | |
| 4,526,565 | A | * | 7/1985 | Hummel | B29C 53/10 383/104 |
| 4,578,051 | A | | 3/1986 | Everman | |
| 6,254,521 | B1 | * | 7/2001 | Pansier | B31B 1/25 493/194 |

FOREIGN PATENT DOCUMENTS

WO    WO 2013/006488 A1    1/2013

OTHER PUBLICATIONS

PCT Written Opinion of the International Searching Authority, and International Search Report, Date of Completion: Sep. 20, 2012; dated Oct. 2, 2012; PCT Application No. PCT/US2010/045100; Filed Jun. 29, 2012; Applicant: Hilex Poly Co. LLC.
PCT International Search Report for PCT Application No. PCT/US12/45100.
PCT International Preliminary Examination Report for PCT Application No. PCT/US12/45100.
PCT Written Opinion for PCT Application No. PCT/US12/45100.

* cited by examiner

*Primary Examiner* — Yogendra N Gupta
*Assistant Examiner* — Emmanuel S Luk
(74) *Attorney, Agent, or Firm* — Nelson Mullins Riley & Scarborough LLP (57) ABSTRACT

The invention is directed to a method and apparatus for maintaining the inflation level of a bubble formed by nips in a moving roll of tubular film, to form a gusset in a final product produced from the film.

23 Claims, 6 Drawing Sheets

AUTOMATED GUSSET INFLATION SYSTEM AND METHOD

This application claims the priority benefit under U.S. Provisional Application No. 61/504,003 filed Jul. 1, 2011 and U.S. Provisional Application No. 61/503,707 filed Jul. 1, 2011, the entirety of which are hereby incorporated by reference.

BACKGROUND OF THE INVENTION

(1) Field of the Invention

The invention relates generally to automated gusset inflation systems and methods for using the same.

SUMMARY OF THE INVENTION

In an embodiment, the invention is directed to an apparatus for maintaining the inflation level of a bubble formed by nips in a moving roll of tubular film, said apparatus comprising: a processor which receives input signals and transmits output signals; at least one inflation sensor which senses the inflation level of the bubble and sends a signal to the processor; at least one valve which receives a signal from the processor and opens, releasing pressurized air to a nozzle; and at least one nozzle which is positioned to release a burst of pressurized air such that the pressurized air pierces the film and injects air into the bubble.

In another embodiment, the invention is directed to an apparatus for maintaining the inflation level of a bubble formed by nips in a moving roll of tubular film, said apparatus comprising: a processor which receives input signals and transmits output signals; at least one inflation sensor which senses the inflation level of the bubble and sends a signal to the processor; at least one valve which receives a signal from the processor and opens, releasing pressurized air to a nozzle; at least one nozzle which is positioned to release a burst of pressurized air such that the pressurized air pierces the film and injects air into the bubble; and at least one photoelectric sensor which detects the position of the film based upon the film print and sends input signals to the processor.

In yet another embodiment, the invention is directed to a method for maintaining the inflation level of a bubble formed by nips in a moving roll of tubular film without damaging a bag made from the film, the method comprising: sensing the inflation level of the bubble; sensing the position of the film relative to a pressurized air nozzle; upon an indication of a low inflation level, injecting a burst of pressurized air into the film bubble such that the pressurized air pierces the film at a position in the film that will become the discarded handle cutout, thereby injecting air into the bubble; and repeating the injection step until the inflation level of the bubble is sensed at an appropriate level.

In another embodiment, the invention includes a method for maintaining the inflation level of a bubble formed by nips in a moving roll of tubular film. The method includes manually activating a release of a burst of pressurized air from a stationary nozzle to inflate the tubular film, wherein the pressurized air released from the nozzle pierces the film and injects air into the tubular film.

BRIEF DESCRIPTION OF THE DRAWINGS

A full and enabling disclosure of the present invention is set forth in the specification, which refers to the appended figures, in which.

DETAILED DESCRIPTION OF THE EMBODIMENTS

Reference now will be made in detail to the embodiments of the invention, one or more examples of which are set forth below. Each example is provided by way of explanation of the invention, not a limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment.

Thus, it is intended that the present invention covers such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

The U.S. grocery market is dominated by T-shirt plastic bags as the preferred package for loading and transporting purchased items from the check-out counter. T-shirt plastic bags, with self-opening features and associated rack systems, have evolved into a highly efficient and effective method for moving purchased items quickly through the front end of grocery and other stores. Generally speaking, a T-shirt plastic bag is made from a thin, highly flexible thermoplastic material and has integral loop handles for carrying a loaded bag. The bag is typically formed from a flattened tube portion selectively severed from a length of thermoplastic tubing. The severed portion is then heat sealed along the lower and upper edges. The handles are formed by cutting a T-shirt-like formation from the sealed upper edge of the tube portion. The T-shirt bag can be reinforced by providing a double overlap on either edge of the thermoplastic tube, such as by gusseting.

During the manufacture of gusseted bags, plastic film is typically extruded in the form of a tube, and wound onto a roll. The tubing is then taken to a bag making machine, unwound, printed, and gusseted. The gusseted film is then flattened, cut, sealed, stacked, and die-cut to form individual bags. An exemplary process of bag manufacturing is provided in U.S. Pat. No. 5,335,788, which is incorporated herein by reference in its entirety as if set forth fully herein for disclosures concerning the manufacture of bags.

The typical means for forming pleats or gussets in tubular film stock is to inflate a portion of the film as it passes between separate sets of nip rolls, forming an air bubble, and then folding or plowing in the sides of the film bubble by mechanical plows or forming devices. Because the nip rolls cannot completely seal the bubble by squeezing, constant air losses occur, eventually causing the bubble to deflate slightly. Once the bubble deflates beyond a certain point, it becomes difficult to form wrinkle-free side gussets in the tubing. It is common practice for the operator to manually re-inflate the bubble periodically to compensate for the air that has leaked past the nips. This can be accomplished by injecting air into the bubble at certain intervals to ensure proper inflation and proper formation of the side folds. Standard gusseting operations intermittently puncture the film being gusseted and then inject air by means of a needle or similar mechanism. This method damages the film, requiring those bags which have been injected to be discarded.

The automated gusset inflation system of the invention is designed to detect and maintain a level of inflation at the gusseter that is conducive to the manufacture of high quality, wrinkle-free, bags. The system is designed such that it operates without any moving parts, largely limiting mechanical failures. Any piercings in the bags due to reinflation of the gusseter are placed within the handle cutout of the bags, thereby eliminating damage to the body of the bags themselves.

Figure 1:
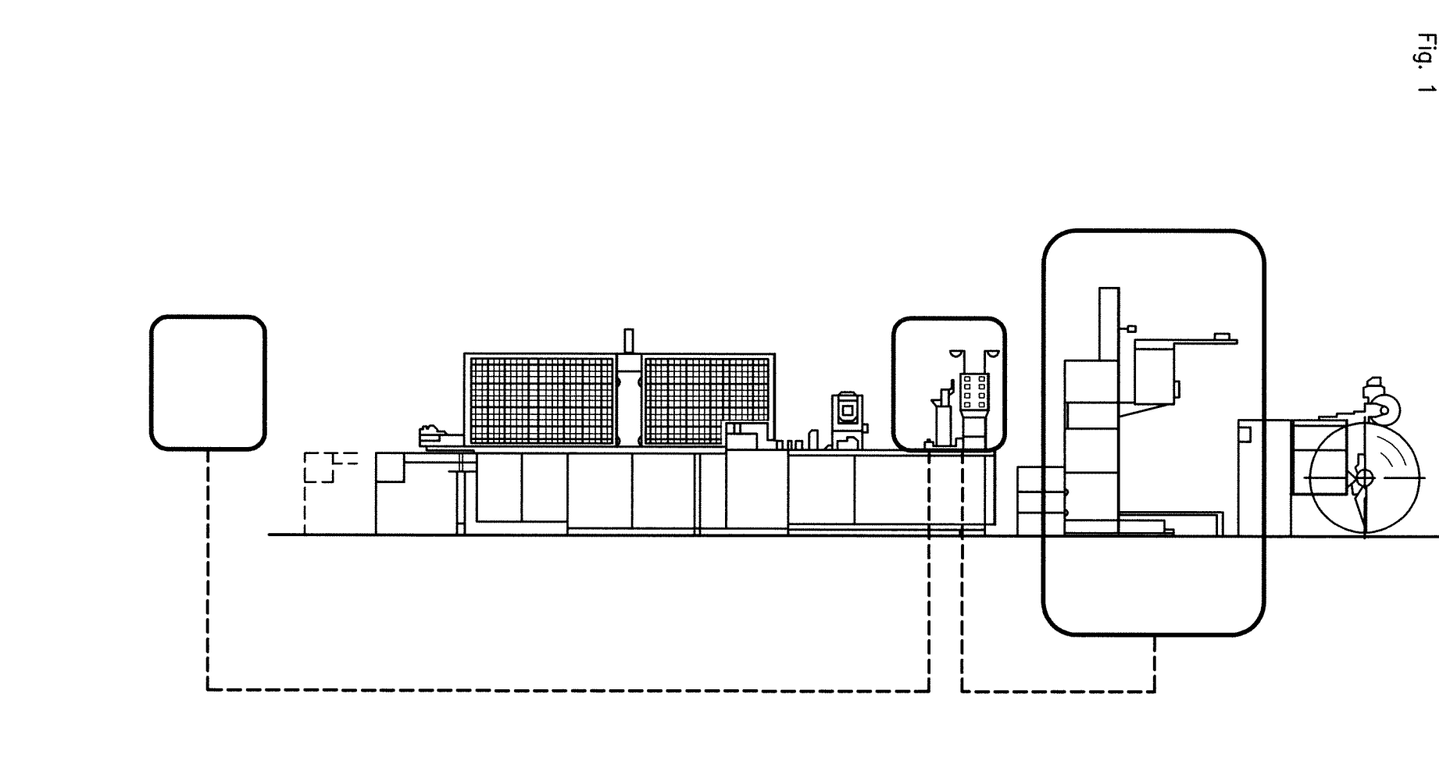
FIG. 1 is a diagram of an embodiment of the automatic gusseting machine.
Figure 2:
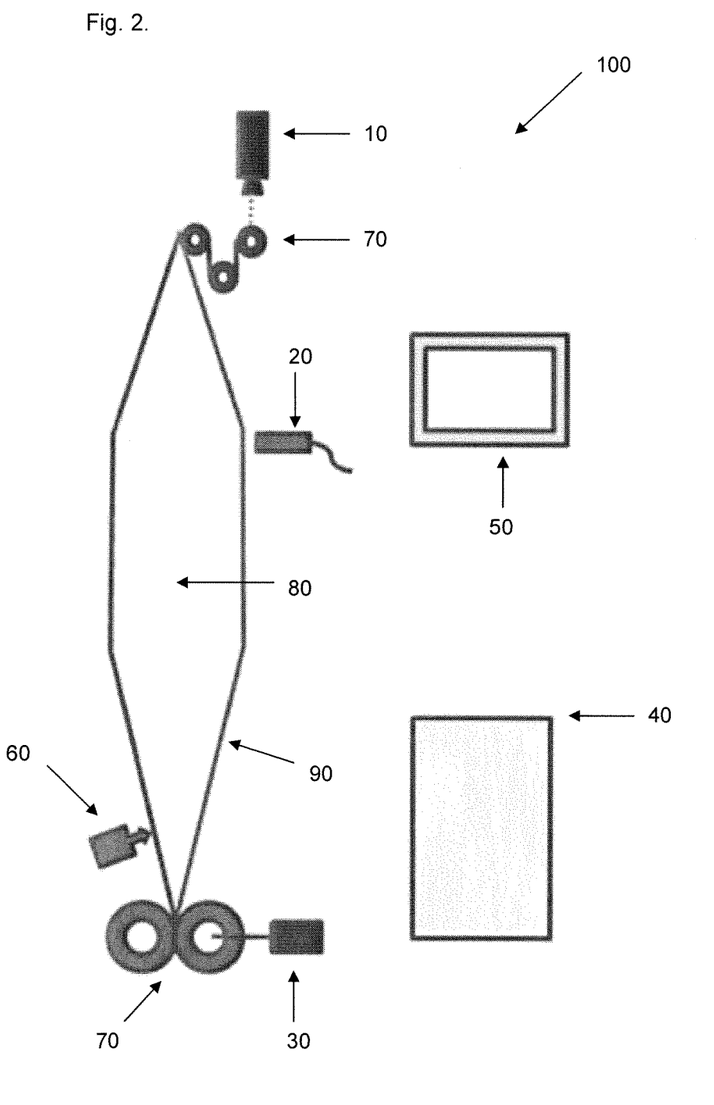
FIG. 2 is a schematic of an embodiment of the automatic gusseting machine.

Generally speaking, a standard film-forming extruder can be used to extrude a plastic melt in the form of a continuous tube. Referring to FIG. 2, the extruded tube of thermoplastic film 90 can then be provided to a bag fabrication line via guide rollers. Tube of film 90 is fed through nips 70 of the gusseting apparatus 100. Between the nips 70 of gusseting apparatus 100, and with one pair of the nip rolls being open, the tube of film may be inflated. The nip rolls 70 may then be tightened together, pinching the tubing closed and retaining the inflation air in a bubble. Film 90 may be continually advanced through gusseting apparatus 100 in this form. Gusseting blades (not shown) may tuck the sides of the tubing inwardly. Film 90 may then be flattened between the second set of nip rolls 70 to retain the gusseted structure in the tube. Film 90 may then be advanced beyond gusseting apparatus 100, cut into bags, sealed at the top and bottom, and finally, have the handle portion cut.

In an embodiment, the present automatic gusseting system detects the location of the print on the film via a photoeye 10, detects the velocity of the film via the encoder 30, detects the inflation level via the inflation sensor 20, and adds air in a location that will ultimately become the handle cutout of the bag. The system limits the number of defective bags created, which would have normally included a hole where air was added in the gusset section. In an embodiment, air is added to the bubble using a short blast of high pressure compressed air directed through a stationary nozzle. The blast of air must be sufficiently strong to both pierce the film and inflate the bubble in one cycle of the valve. Since the film is moving at a relatively high speed during the time the air is added, the injection will cause a hole or slit in the tubing approximately ½" to 1½" long. The system ensures that the hole in the film due to inflation ultimately falls within the handle cut out (discarded) portion of the bag.

The system 100 may consist of, but is not limited to, one or more of the following components:

A photoelectric sensor 10 to detect printing on the film;
an encoder 30 to detect velocity of the film movement;
an inflation sensor 20 to detect the inflation level of the bubble;
a nozzle to direct the compressed air into a high pressure concentrated stream;
a valve 60 to add air when appropriate;
a processor 40, optionally including a high speed counter to capture the input signals and deliver output signals; and
a human machine interface (HMI) 50 to allow the operator to set up and monitor the system.

The photoelectric sensor 10, or photoeye, may be any device used to detect the distance, absence, or presence of an object by using a light transmitter and a photoelectric receiver. The light transmitter may be an infrared transmitter. The photoeye 10 may be of any known type, including but not limited to, opposed (alternatively called "through beam"), retroreflective, or proximity-sensing (alternatively called "diffused"). In an embodiment, the photoeye 10 may be located on a center lane of the gusseter. In another embodiment, the photoeye 10 may detect the position of the print on the thermoplastic film moving through the system. In yet another embodiment, the photoeye 10 may comprise an Eyemark Sensor. The photoelectric sensor 10 may send one or more output signals to the processor 40 during operation of the system. If desired, the photoeye may, through transmission of a signal to processor 40 and from processor 40 to HMI 50, alert the operator when the position of print on the bag is not appropriately aligned.

The encoder 30 may sense information indicative of the velocity of the film as it passes through the system. In some embodiments, the encoder 30 is an optical encoder. In an embodiment, the encoder may be mounted on the end of the shaft of a roller, which is in turn mounted on the framework of the automatic gusset inflation system. The encoder may send one or more output signals to processor 40 during operation of the system. In an embodiment, the processor may count the number of pulses received from the encoder (corresponding to the number of revolutions of the roller), multiply the number of revolutions by the circumference of the roller attached to the encoder, and then calculate the length of film which has traveled through the machine. Thus, the encoder allows the processor to calculate the amount of film passing through the system and the velocity of the same. The encoder may assist the system in placing any necessary air injection sites within the discarded handle cutout of the bag. In an alternative embodiment, a clock timer may be used as an encoder within the scope of the present invention.

In an embodiment, the film rolls of the automated gusset inflation system may be run at a speed of from about 100 to about 200 meters/minute. In another embodiment, the film rolls of the automated gusset inflation system may be run at a speed of from about 150 to about 160 meters/minute.

The inflation sensor 20 may comprise any sensor known in the art to be compatible with the inventive process. In an embodiment, the sensor 20 is an ultrasonic sensor. In this embodiment, the ultrasonic sensor may comprise any ultrasonic sensor known in the art. In a particular embodiment, the ultrasonic sensor may generate high frequency sound waves, evaluate the echo received back from the sound waves, and then calculate the time interval between sending the signal and receiving the echo to determine the distance to an object. In a particular embodiment, this may comprise a Banner™ ultrasonic sensor. In an embodiment, an ultrasonic sensor is present on each lane to detect the inflation level of the film.

In some embodiments, the inflation sensor is positioned within 5 inches of the thermoplastic film. In some embodiments, the inflation sensor is positioned within 3 inches of the thermoplastic film. In some embodiments, the inflation sensor is positioned within 1 inch of the thermoplastic film.

Figure 2A:
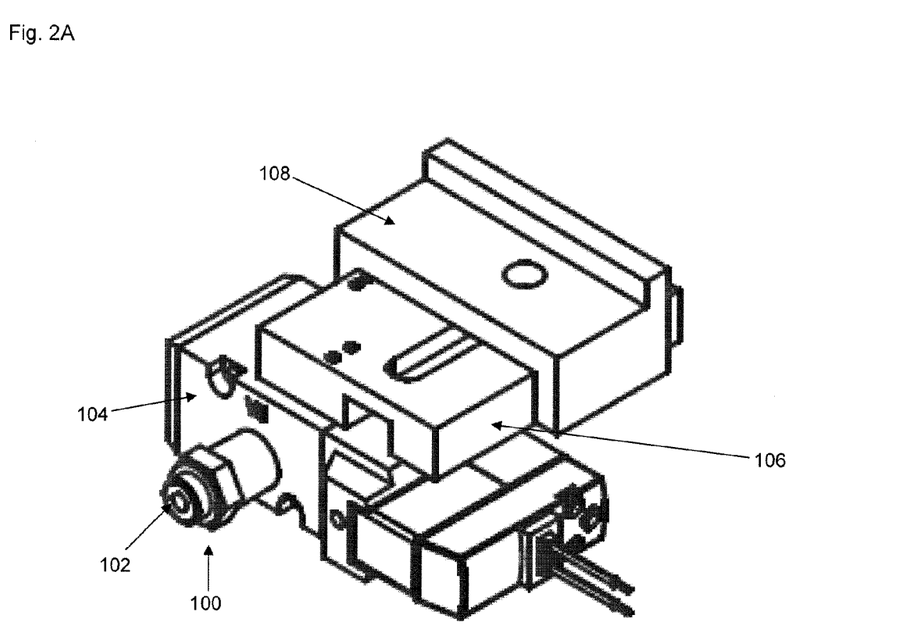
FIG. 2A is a schematic of an embodiment of a nozzle structure.

The nozzle may be any spray nozzle known in the art or capable of employment in the present invention. In one embodiment, the spray nozzle may be a solid stream spray nozzle, designed to handle high-velocity materials. By way of example, FIG. 2A depicts an exemplary nozzle structure that may be used within the scope of the present invention. As shown, nozzle 100 has an orifice 102. In some embodiments, a nozzle may have an orifice of about 0.1 to about 0.15 inches, including 0.125 inches. Nozzle 100 is attached to nozzle body 104, which may include a solenoid (not shown). Solenoid valve 104 is also attached to nozzle adjustment blocks 106 and 108, which may function to adjust the position of the nozzle. For instance, in some embodiments, nozzle adjustment block 106 may be used to adjust the nozzle inward and outward from a thermoplastic film, and nozzle adjustment blocks 108 may be used to adjust the nozzle in the horizontal position (i.e, left and right). In some embodiments, the nozzle may be positioned in close proximity to the film or touching the film.

The nozzle may direct the compressed air into a high pressure, concentrated stream. In an embodiment, the pressure utilized with the nozzle may be between about 50 psi and 150 psi. In another embodiment, the pressure utilized with the nozzle may be between about 75 psi and 125 psi. In a particular embodiment, the pressure utilized with the nozzle may be between about 80 psi and 100 psi. In still another embodiment, the pressure of the air emanating from the nozzle may be about 90 psi.

In an embodiment, the blast of pressurized air from the nozzle may last from about 1 to about 50 milliseconds in duration. In another embodiment, the blast of pressurized air from the nozzle may last from about 5 to about 20 milliseconds in duration. In a particular embodiment, the blast of pressurized air from the nozzle may last about 10 milliseconds in duration. In an embodiment, the blast of air from the nozzle may create a hole or slit in the film that is approximately ½ inch to 1½ inches in length. In another embodiment, the blast of air from the nozzle may cause a hole or slit in the film which is approximately 1 inch to 1½ inches in length.

Figure 3:
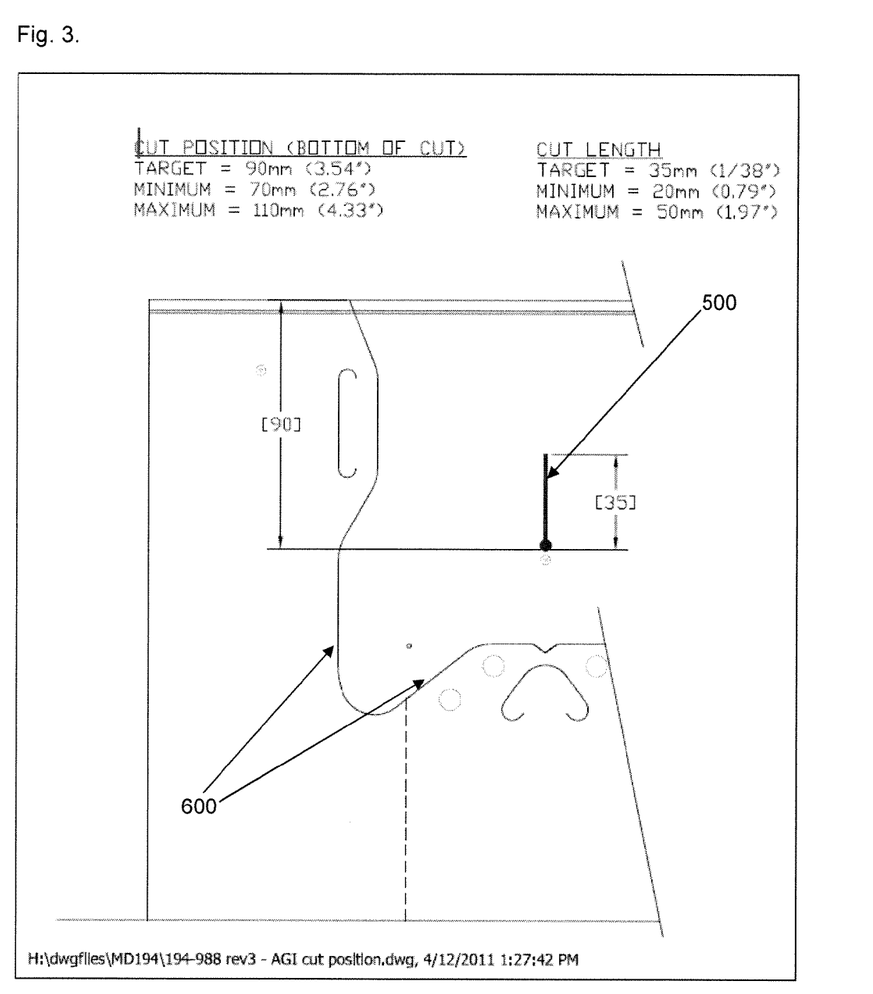
FIG. 3 is a graph showing the position and tolerance for the slit created by the automatic gusseting system of the invention.
Figure 4:
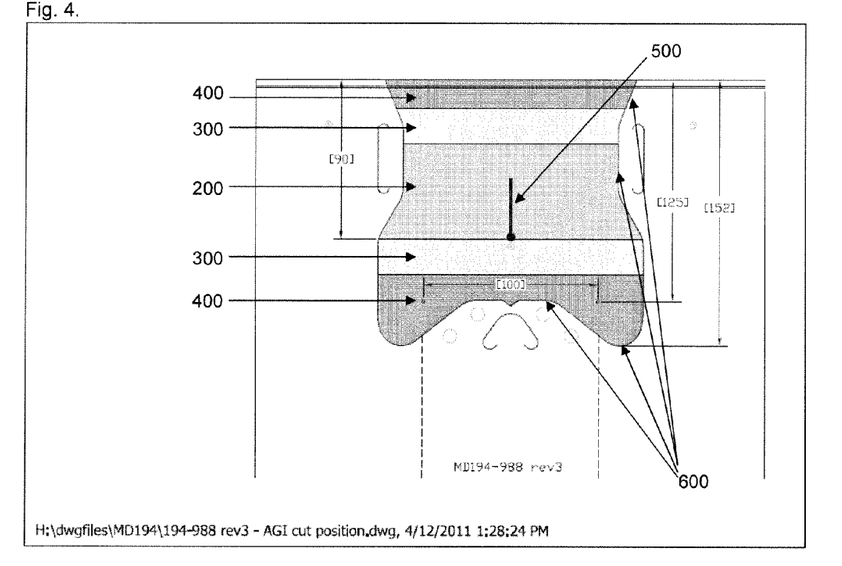
FIG. 4 is a graph showing the location of the slit created, within the handle cutout, by the automatic gusseting system of the invention.

The slit caused by the injection of air may be located within the discarded handle cutout through the use of the photoeye 10 and encoder 30. However, other devices or methods may be utilized to ensure that the placement of the slit is within the handle cutout. The specific placement of the slit will depend on the dimensions of the film being processed. As a non-limiting example, as shown in FIGS. 3 and 4, if the handle length is 6 inches±¼ inch (shown in FIG. 4 as 152 millimeters) and the range is 4.88 inches±¼ inch (shown in FIG. 4 as 125 millimeters), the bottom of the slit should be about 2.76 to 4.33 inches (70 to 110 millimeters) from the top of the bag and the total length of the slit should be about 0.79 to 1.97 inches (20 to 50 millimeters). In a particular embodiment, the bottom of the slit should be about 3.54 inches (90 millimeters) from the top of the bag and the total length of the slit should be about 1.38 inches (35 millimeters). In an embodiment, the slit should be positioned as near to center of the bag as possible. It should be understood that these parameters may change based upon the desired size of the bags to be formed.

In an embodiment, the nozzle is stationary within the system. The nozzle may be connected to transmission lines and/or a manifold. The nozzle is positioned near enough to the thermoplastic film bubble such that when the thermoplastic film receives a blast of pressurized air, the pressurized air pierces the film and inflates the bubble to some extent in one cycle of the valve. In an embodiment, the nozzle is positioned adjacent to the thermoplastic film. In another embodiment, the nozzle is touching the thermoplastic film. In some embodiments of the invention, a needle is not needed to pierce the bubble, as the pressurized air alone is strong enough to pierce the bubble.

The valve 60 used for controlling the pressurized air distribution to the nozzle may be any known in the art or any that may be employed in the present invention. In an embodiment, the valve 60 is a solenoid valve. In an embodiment, the solenoid valve is an electromechanical valve on a transmission line that is controlled by electric current through a solenoid. The valve 60 is operably linked to the processor 40, which determines whether the valve is on or off. In an embodiment, the system may comprise multiple solenoid valves that may be formatted on a manifold (not shown).

The processor 40 may be any known in the art or any that may be employed in the present invention. In an embodiment, the processor may be a programmable logic controller (PLC). In another embodiment, the processor may additionally comprise a high speed counter to capture input signals. In a particular embodiment, the processor may comprise an Allen-Bradley MicroLogix™ 1400 processor. In still another embodiment, the processor may be a computer. Signal inputs for the processor may comprise one or more of the following: (1) photoelectric sensor(s), (2) inflation sensor(s), and (3) encoder(s). The processor 40 may also send output signals to the solenoid valve(s) 60. Additionally, the processor 40 may receive input signals from, and send output signals to, human machine interface (HMI) 50.

HMI 50 is the user interface for the system of the present invention. Any HMI known in the art or any HMI compatible with the present system may be utilized in the invention. In an embodiment, the HMI may provide graphics-based visualizations of the automatic gusseting system. In another embodiment, the HMI may reside in a Windows-based or Macintosh-based computer that communicates with the processor. HMI 50, in an embodiment, may include one or more of a monitor, control panel, keyboard, keypad, touchpad, mouse, and/or speakers. In a particular embodiment, HMI 50 may be a Red Lion™ G310 operator interface.

Optionally, the invention may also comprise a distribution manifold. The distribution manifold may be any known in the art or any that may be employed in the present invention. The distribution manifold distributes pressurized air from one or more air tanks ultimately to the nozzle. One or more transmission lines may be utilized to accomplish distribution of the pressurized air from the air tanks to the nozzle.

In an embodiment, alarms may be set such that an alarm is activated if the gusseter bubble becomes under- or over-inflated. The alarm may, in an embodiment, be configured to alert an operator of the inflation conditions. In another embodiment, if the inflation sensor detects that the inflation of the thermoplastic tubing has fallen below a predetermined value, the system may automatically provide additional compressed air from the nozzle in an amount sufficient to inflate the tubing to a desired level.

In operation, a human operator may set up the system to ensure that the slit in the bag falls within the handle cutout. For example, the operator may input the bag length and offset values into the HMI. The photoeye 10 may then be positioned as close to the center of the printing on the bag as possible. Similarly, in an embodiment, the inflation sensor may be positioned as near to the center of the gusseted bubble as possible. In addition, in an embodiment, the emitter/receiver of the inflation sensor may be aligned with the surface of the bubble. If necessary, the operator may then calibrate the photoeye to the color of the film on the system. The operator may also ensure that no wrinkles in the film are positioned under the photoeye.

In an embodiment of operation, each time the system is re-started, the photoeye mounted on the gusseter must see a certain number of continuous "good" eyemarks (detecting the position of print on the bags) before the system is enabled. In an embodiment, the number of continuous "good" eyemarks may be between about 50 and 200. In another embodiment, the number of continuous "good" eyemarks may be about 100. An eyemark may, for example, be considered "good" if it is within a tolerance of +/−10 mm of the bag length entered into the operator interface.

In an embodiment, the system may be preset to a particular inflation level, depending on the particular bag manufacture. The inflation sensor detects the inflation level of the gusseted bubble. If the detected inflation level falls below the low preset level parameter, the processor may begin the process sequence to re-inflate the bubble.

Once the system is enabled and a particular lane calls for air, the system cycles the solenoid valve, delivering a short burst of air which pierces the film and causes a short slit in the film. The short bursts of air are administered to consecutive bags and continue to fill the bubble until the inflation sensor detects the high preset level parameter. In an embodiment, the operating range of the ultrasonic gusset inflation sensor may be from a low preset of 75 to a high preset of 80. These preset values are based upon a relative scale that may be referenced to desirable inflation levels for a particular process.

In an embodiment, if the inflation sensor detects a value of 50 or less, the system will disable and send a fault message to the HMI. In this particular embodiment, an inflation level of 50 or less is considered too low (i.e. the film is not tight enough) to be penetrated reliably by the air blast from the nozzle. In another embodiment, the system may disable and send a fault message to HMI 50 if the inflation sensor detects an inflation value of 90 or more. At this level the bubble may be considered over inflated and could possibly burst.

With regard to the embodiments shown in FIGS. 3 and 4, which are images of a film that is being processed to create a t-shirt bag. As shown, the line 600 extends around a portion of the film to indicate a cutout portion (interior of line 600) that will ultimately be removed from the film and will not form a portion of the completed bag. As shown, the film includes a slit 500 created by the automatic gusseting system of the invention, and the depicted slit is within the cutout portion of the film.

Figure 5:
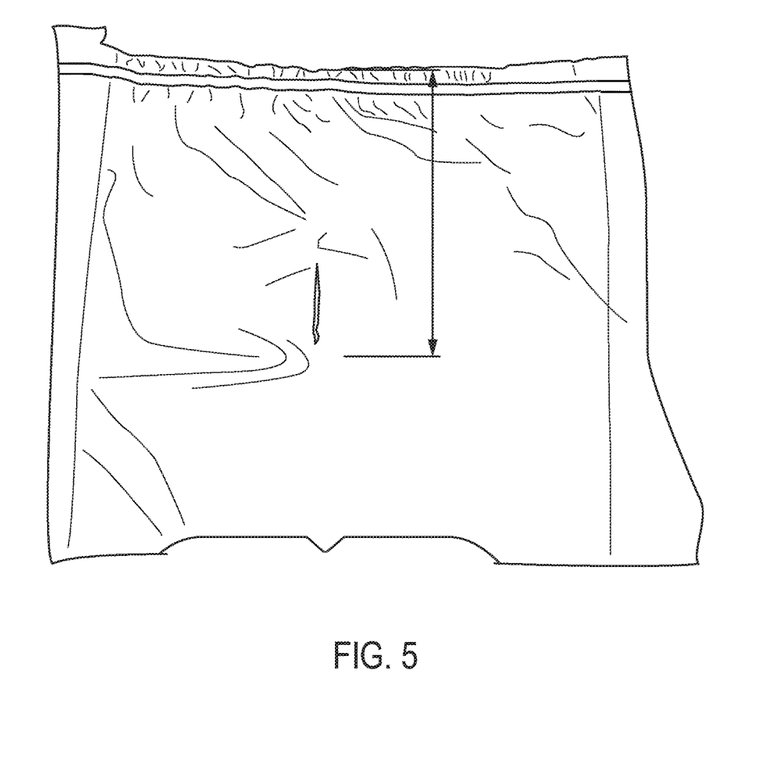
FIG. 5 is a photograph showing the slit location in the handle cutout, as produced by the automatic gusseting system of the invention.

In addition, portions 200, 300, and 400 of the film shown in FIG. 4 illustrate the desirability of locations for creating a slit in some embodiments of the present invention. As shown, the portion identified as 200 illustrates the ideal inflation range for certain embodiments. The portion identified as 300 illustrates the maximum acceptable position for the slit based on position and length tolerance. The portion identified as 400 illustrates that the system is out of range and the operator should stop and take corrective action. In addition, FIG. 5 is an image of a film having a slit formed in a cutout portion of a film by a system of the present invention.

In an embodiment, several gusseting operations may be set up with one processor and/or HMI. In an embodiment, the gusseting operations may be set up on multiple lanes. In other embodiments, several bubbles may be utilized in a single machine. In either embodiment, the present invention could be utilized.

In still a further embodiment of the present invention, a system may comprise a stationary nozzle located in proximity to or touching the thermoplastic film. Upon manual detection that inflation or additional inflation of a film is necessary or desired, such as upon visual inspection, an operator may initiate compressed air to be discharged from the stationary nozzle. This manual operation may be performed, by way of example, by an operator depressing a button that controls the opening and closing of a valve on the nozzle. By using the stationary nozzle, the placement of the slit created in the film by the air burst can be located at a predetermined portion of the film. In addition, as described above, a photoeye and an encoder may be employed in this embodiment to further strategically position the slit created on the film. In addition, an operator may manually control the volume of pressurized air released, such as by holding down the button to continue the release of pressurized air until a desirable amount has been released. In other embodiments, the volume of gas released may be predetermined, and an operator may depress the button multiple times if additional pressurized air is desired. In still other embodiments, the volume of pressurized air released may be automated by the use of an inflation sensor, as described above, to determine the volume of air necessary to inflate the tubular film to a predetermined level.

Although particular embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of the various embodiments may be interchanged both in whole or in part. Therefore, the spirit and scope of the appended claims should not be limited to the description of the preferred versions contained therein.

What is claimed is:

1. An apparatus for maintaining the inflation level of a bubble formed by nips in a moving roll of tubular film, said apparatus comprising:
   a. a processor which receives input signals and transmits output signals;
   b. at least one inflation sensor which senses the inflation level of the bubble and sends a signal to the processor;
   c. at least one valve which receives a signal from the processor and opens, releasing pressurized air to a nozzle;
   d. at least one encoder configured to sense information indicative of the velocity of the film and send the information to the processor, wherein the processor calculates a predetermined position in the film based on the information; and
   e. at least one nozzle which is positioned and configured to release a burst of pressurized air such that the pressurized air pierces the film at the predetermined position in the film that will become a discarded handle cutout and injects air into the bubble to maintain or restore its inflation.

2. The apparatus of claim 1 wherein the valve is a solenoid valve.

3. The apparatus of claim 1 wherein the inflation sensor is an ultrasonic sensor.

4. The apparatus of claim 1 additionally comprising at least one photoelectric sensor.

5. The apparatus of claim 4 wherein the photoelectric sensor detects the position of the film based upon print located on the film and sends input signals to the processor.

6. The apparatus of claim 1 wherein the information sensed by the encoder comprises the number of revolutions of a film roller.

7. The apparatus of claim 1 wherein the at least one encoder is an optical encoder.

8. The apparatus of claim 1 additionally comprising at least one gusseting mechanism which gussets the roll of tubular film.

9. The apparatus of claim 1 wherein the processor is a programmable logic controller.

10. The apparatus of claim 1 additionally comprising at least one human machine interface which receives input signals from and sends output signals to the processor.

11. The apparatus of claim 1 wherein the pressure utilized with the nozzle is from about 50 psi to about 150 psi.

12. The apparatus of claim 1 wherein the pressure utilized with the nozzle is from about 75 psi to about 125 psi.

13. The apparatus of claim 1 wherein the pressure utilized with the nozzle is from about 80 psi to about 100 psi.

14. The apparatus of claim 1 wherein the pressure utilized with the nozzle is about 90 psi.

15. The apparatus of claim 1 wherein the injection of pressurized air from the nozzle is from about 1 to about 50 milliseconds in duration.

16. The apparatus of claim 1 wherein the injection of pressurized air from the nozzle is from about 5 to about 20 milliseconds in duration.

17. The apparatus of claim 1 wherein the injection of pressurized air from the nozzle is about 10 milliseconds in duration.

18. The apparatus of claim 1 wherein the nozzle is stationary.

19. An apparatus for maintaining the inflation level of a bubble formed by nips in a moving roll of tubular film, said apparatus comprising:
   a. a processor which receives input signals and transmits output signals;
   b. at least one inflation sensor which senses the inflation level of the bubble and sends a signal to the processor;
   c. at least one valve which receives a signal from the processor and opens, releasing pressurized air to a nozzle;
   d. at least one encoder configured to sense information indicative of the velocity of the film and send the information to the processor, wherein the processor calculates a predetermined position in the film based on the information;
   e. at least one nozzle which is positioned and configured to release a burst of pressurized air such that the pressurized air pierces the film at the predetermined position in the film that will become a discarded handle cutout and injects air into the bubble to maintain or restore its inflation; and
   f. at least one photoelectric sensor which detects the position of the film based upon print located on the film and sends input signals to the processor.

20. An apparatus for maintaining the inflation level of a bubble formed by nips in a moving roll of tubular film, said apparatus comprising:
   a. a processor which receives input signals and transmits output signals;
   b. at least one inflation sensor which senses the inflation level of the bubble and sends a signal to the processor;
   c. at least one valve which receives a signal from the processor and opens, releasing pressurized air to a nozzle;
   d. at least one nozzle which is positioned and configured to release a burst of pressurized air such that the pressurized air pierces the film at a predetermined position in the film that will become a discarded handle cutout and injects air into the bubble to maintain or restore its inflation;
   e. at least one photoelectric sensor which detects the position of the film based upon print located on the film and sends input signals to the processor; and
   f. at least one encoder which senses the number of revolutions of a film roller and transmits information to the processor, wherein the processor calculates the predetermined position in the film based on the information.

21. A method for maintaining the inflation level of a bubble formed by nips in a moving roll of tubular film without damaging a bag made from the film, the method comprising:
   a. sensing the inflation level of the bubble;
   b. sensing the position of the film relative to a pressurized air nozzle;
   c. upon an indication of a low inflation level, injecting a burst of pressurized air into the film bubble, by activating the nozzle, such that the pressurized air pierces the film at a position in the film that will become a discarded handle cutout, thereby injecting air into the bubble, wherein a photoelectric sensor and the encoder operate to release the pressurized air to contact the tubular film at a predetermined location after the nozzle is activated, wherein the predetermined location is a portion of the film that will be discarded from an end product prepared from the film; and
   d. repeating the injection step until the inflation level of the bubble is sensed at an appropriate level.

22. The method of claim 21, wherein the method is used to make a t-shirt type plastic grocery bag.

23. The method of claim 21, wherein the method is used in a gusseting operation.

* * * * *